(12) United States Patent
Nau et al.

(10) Patent No.: US 7,506,824 B2
(45) Date of Patent: Mar. 24, 2009

(54) ATOMIZER DEVICE

(75) Inventors: Michael Nau, Dornhan/Aischfeld (DE);
Marc Bareis, Markgroeningen (DE);
Frank Ilgner, Stuttgart (DE); Horst Harndorf, Schauenburg (DE)

(73) Assignee: Robert Bosch GmbH, Stuttgart (DE)

( * ) Notice: Subject to any disclaimer, the term of this patent is extended or adjusted under 35 U.S.C. 154(b) by 391 days.

(21) Appl. No.: 10/520,219

(22) PCT Filed: Jun. 24, 2003

(86) PCT No.: PCT/DE03/02091

§ 371 (c)(1),
(2), (4) Date: Aug. 5, 2005

(87) PCT Pub. No.: WO2004/006373

PCT Pub. Date: Jan. 15, 2004

(65) Prior Publication Data

US 2006/0097072 A1    May 11, 2006

(30) Foreign Application Priority Data

Jul. 3, 2002    (DE) ............................. 102 29 871

(51) Int. Cl.
*B05B 15/00* (2006.01)
(52) U.S. Cl. ............... 239/397.5; 239/128; 239/403; 239/433; 239/584; 239/DIG. 4; 239/600; 123/470
(58) Field of Classification Search ........... 239/128, 239/135, 310, 399, 403, 433, 434, 584, 397.5, 239/DIG. 4, 600; 123/470, 472
See application file for complete search history

(56) References Cited

U.S. PATENT DOCUMENTS

| | | | |
|---|---|---|---|
| 2,904,417 A | 9/1959 | Te Nuyl | |
| 3,971,847 A | 7/1976 | Houseman | |
| 4,589,596 A * | 5/1986 | Stumpp et al. | 239/397.5 |
| 6,991,183 B2 * | 1/2006 | Nau et al. | 239/399 |
| 7,070,126 B2 * | 7/2006 | Shinogle | 123/470 |
| 2001/0013321 A1 | 8/2001 | Workman et al. | |
| 2002/0079384 A1 | 6/2002 | Popov | |

FOREIGN PATENT DOCUMENTS

| | | |
|---|---|---|
| DE | 4118538 | 12/1992 |
| DE | 4409848 | 10/1995 |
| DE | 19637103 | 3/1998 |
| DE | 197 27 841 | 1/1999 |
| DE | 19752245 | 6/1999 |
| DE | 19947312 | 4/2001 |
| DE | 10061035 | 6/2002 |
| DE | 10122147 | 11/2002 |
| EP | 1203750 | 5/2002 |
| WO | WO 96/41685 | 12/1996 |
| WO | WO 00 40856 | 7/2000 |
| WO | WO 01/53676 | 1/2001 |

* cited by examiner

Primary Examiner—Steven J Ganey
(74) Attorney, Agent, or Firm—Kenyon & Kenyon LLP

(57) ABSTRACT

An atomization system for fuels, particularly for charging a chemical reformer for obtaining hydrogen, features at least one metering device, accommodated in a supporting device, for metering fuel into a temperature-adjusted substance stream, which introduces the fuel directly into the temperature-adjusted substance stream without the interpolation of a supply line.

18 Claims, 4 Drawing Sheets

ATOMIZER DEVICE

FIELD OF THE INVENTION

The present invention relates to an atomization system for use in fuel-cell transportation systems.

BACKGROUND INFORMATION

In fuel cell-supported transportation systems, chemical reformers are used for obtaining the required hydrogen from hydrocarbon-containing fuels.

All of the substances needed by the reformer to produce hydrogen, such as air, water and fuel, are ideally supplied to the reformer in the gaseous state. However, since the fuels, such as methanol or gasoline and water, are preferably stored onboard the transportation system in liquid form, they must be heated so as to be vaporized shortly before being fed into the reformer. This requires a pre-evaporator capable of providing adequate quantities of gaseous fuel and water vapor, the waste heat of the reformer normally being used for vaporization.

Since the hydrogen is normally consumed immediately, chemical reformers must be capable of adjusting the production of hydrogen to the demand without delay, e.g. in response to load changes or during start phases. Especially in the cold start phase, additional measures must be taken, since the reformer does not provide any waste heat. Conventional evaporators are not capable of generating adequate quantities of gaseous reactants without delay. It is therefore practical to introduce the fuel into the reformer in a finely divided form with the aid of an atomization device, in which case, provided that there is a sufficient supply of heat, the vaporization process is improved by the large surface area of the finely divided fuel. Devices for reforming fuels are described, for example, in U.S. Pat. No. 3,971,847. According to this reference, the fuel is metered by metering devices, located relatively far away from the reformer, via long supply lines into a temperature-adjusted substance stream and is dispersed via a metering aperture at the end of the supply line into the substance stream which flows to the location of the actual reforming process.

A particularly disadvantageous feature in the devices described in the above-mentioned document is the fact that the long supply lines result in delays and inaccuracies in fuel metering, especially in the case of sharp load changes or warm start phases. If fuel metering is resumed following a stop phase while the fuel is evaporating under the temperature influence from the supply line (for example), this results in a delayed metering of fuel into the temperature-adjusted substance stream and to the reforming process, because the deadspace volume in the supply line first has to be replenished. The same problem arises in the case of a particularly small load. Furthermore, long supply lines stand in the way of compact construction while increasing proneness to error and assembly cost. The use of high fuel pressures for improved atomization has a direct effect on the apportioned fuel quantity.

SUMMARY OF THE INVENTION

By contrast, the atomization system according to the present invention has the advantage that, by virtue of the direct metering of fuel by the metering device without the interpolation of a supply line, it is possible to determine and control the quantity and the time characteristic of the metering of fuel into the temperature-adjusted substance stream far better and more precisely across all operating states of the reformer.

The metering device features a plurality of openings for metering fuel into the temperature-adjusted substance stream. This makes it possible to adjust the metering of fuel more advantageously to the flow conditions of the temperature-adjusted substance stream in the mixing area, which optimizes the distribution of fuel in the substance stream.

Advantageously, a fuel injector is used as a metering device, as is known, for example, from reciprocating internal combustion engines. The use of such injectors has several advantages. Thus, they allow for a particularly accurate open-loop or closed-loop control of fuel metering; the metering may be controlled based on several parameters such as the on-off ratio, the pulse frequency and possibly the admission pressure. In this context, metering is considerably less dependent on pump pressure than in metering devices which regulate the volume flow of the fuel via the line cross section, and the metering range is clearly greater. Moreover, said fuel injectors are reliable components of high durability that have proven effective, are known in terms of their behavior, are relatively inexpensive and chemically stable vis-à-vis the fuels used. Advantageously, high-pressure fuel injectors may be used, since at high fuel pressures they achieve a particularly fine atomization of the fuel, while being particularly insensitive to pressure fluctuations in the system, and since the geometry of the injected fuel cloud is highly controllable. Since these injectors, when used in reciprocating internal combustion engines, are normally mounted in very close proximity to the combustion process, especially in the case of direct injection into the combustion chamber, they are temperature-resistant to relatively high temperatures. The currently high production quantity of high-pressure fuel injectors lowers the production costs for their use in chemical reformers.

The thermal insulation of the metering device from the supporting device safely prevents a thermal overload of the metering device, an insulation using an insulating body, such as a ceramic insulating body, being particularly advantageous. The present invention may be advantageously refined through a gap running between the metering device and the supporting device and/or between the metering device and the insulating body. The gap serves as heat insulation.

Advantageously, the insulating body touches the metering device only for guidance so as to prevent the metering device from deflecting from its position vis-à-vis an axis. The forces transmitted in this connection and hence the heat transfer between the insulating body and the metering device at the points of contact are relatively low.

An additional advantageous refinement is possible in that the supporting device is made of a housing and an upper housing part, thus is of two-part construction, the two parts only touching each other indirectly, via the insulating body, for example. The upper housing part is advantageously insulated by a gap from the thermally more highly stressed housing.

An additional advantageous refinement results when the housing and the upper housing part are fixed in position using fixing elements, allowing for the thermal insulation of the fixing elements from the housing and/or upper housing part using insulating elements. Advantageously, the insulating elements may also be made at least partly of a ceramic material.

It is furthermore advantageous if the metering device rests for its support only on the upper housing part of the supporting device and, for example, not on the housing. A third seal, which may be made at least partly of an elastomer, may advantageously seal the first gap between the metering device and the upper housing part.

The atomization system according to the present invention may in addition be advantageously refined in that the metering device meters fuel into a mixing area, while the temperature-adjusted substance stream may be advantageously fed radially or at least partly tangentially into the mixing area via a supply line. This promotes the formation of a swirl and thus an improved turbulence of the fuel in the temperature-adjusted substance stream.

An excessive supply of heat to the metering device may be prevented and a more favorable flow pattern may be achieved in the mixing area by directing the flow of the temperature-adjusted substance stream away from the metering device as it enters the mixing area, the angle between the imaginary extended longitudinal axis of the metering device and the direction at which the temperature-adjusted substance stream enters the mixing area being less than 90°, for example.

Excessive heat conduction and heat absorption may be advantageously prevented by a recess in the housing running, for example, towards the mixing area above the direction of flow of the temperature-adjusted substance stream.

If the supporting device is advantageously designed in such a way that its outer surface area increases beginning at the hot flow outlet facing the reformer, into the reformer, then heat absorption from the reformer is restricted and heat dissipation in the part of the supporting device facing away from the flow outlet is promoted.

If the outer surface area of the supporting device increases beginning at a mixing area and counter to the direction of flow of the temperature-adjusted substance stream, or mixture of fuel and temperature-adjusted substance stream, prevailing inside the mixing area, then heat absorption of the supporting device from the temperature-adjusted substance stream is restricted and heat dissipation in the part of the supporting device facing away from the prevalent direction of flow is promoted.

DETAILED DESCRIPTION

Figure 1:
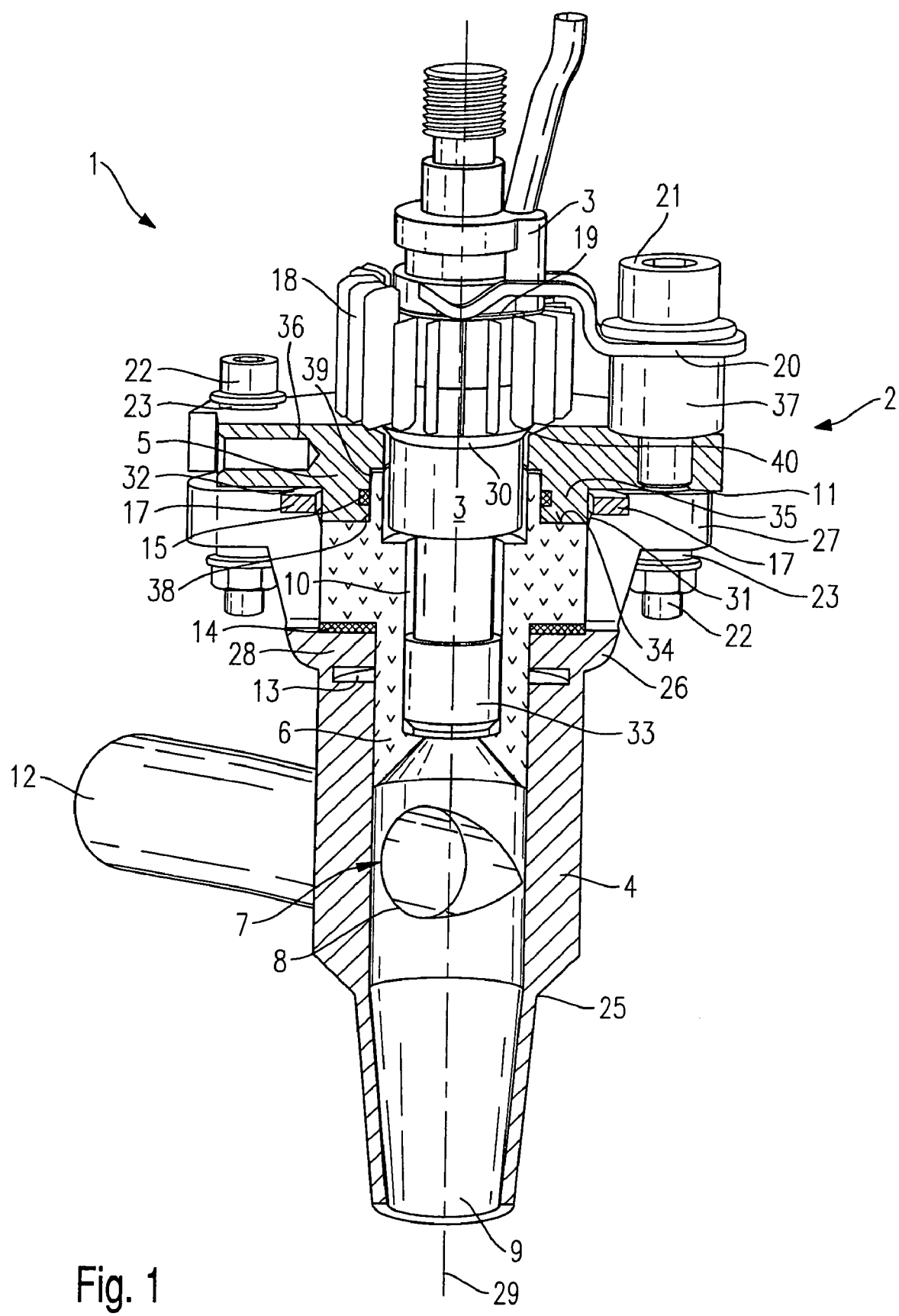
FIG. 1 is a schematic sectional view of an exemplary embodiment of an atomization system according to the present invention.

An exemplary embodiment of the present invention is described below by way of example. Identical parts are provided with the same reference numerals in all of the figures.

FIGS. 1, 2, 3, and 4 show an exemplary embodiment of an atomization system 1 according to the present invention in the form of an atomization system 1 for the use of high-pressure fuel injectors. Atomization system 1 is particularly suitable for charging and atomizing fuel into a chemical reformer (not shown) for obtaining hydrogen.

Atomization system 1 depicted in FIG. 1 is essentially made up of a supporting device 2 for supporting a metering device 3 developed in the form of a high-pressure fuel injector in this exemplary embodiment.

Supporting device 2 is made up of a pipe-like housing 4 having a flow outlet 9 located at its lower end, through which a substance stream made up of air and water vapor for example, enriched, for instance, with gasoline and temperature-adjusted to 450° C., is fed into a chemical reformer (not shown). The outer diameter of housing 4 increases, at first conically, from flow outlet 9 upwards, counter to the spray-discharge direction of metering device 3, while the thickness of the wall remains constant. In the upward direction, a subsequent, strongly tapered first diameter step 25 then expands the diameter of housing 4 further into a cylindrical section of increased wall thickness, which ends in a second diameter step 26. Second diameter step 26, increasing the outer diameter, has a rounded outer contour and forms an inner shoulder 28 on the inside of housing 4, which also widens the inner diameter of housing 4.

Below second diameter step 26, a recess 13 in the housing greatly increases the inner diameter of housing 4 over a relatively short span. It is used to improve the heat insulation between the part of housing 4 located below diameter step 26 and the part of housing 4 located above diameter step 26. Upward of second diameter step 26, the outer diameter of housing 4 at first increases again conically before ending in a third diameter step 27. The cylindrically widened area of the inner diameter of housing 4 upward of interior shoulder 28 is followed at the upper end of housing 4 by a chamfer 31, which, while slightly widening further the inner diameter of housing 4, ends in a recess 32, which widens the inner diameter, and in which a ring-shaped supporting element 17 is inserted. Supporting element 17 absorbs forces acting radially inward onto the upper part of housing 4 and is made of steel, for example.

An insulating body 6 attaches to the radially symmetric interior forms in the upper area of housing 4 with an exact fit and relatively little play, insulating body 6 resting on inner shoulder 28 by way of an annular disk-shaped seal 14 made of pure graphite, for example, and featuring an expanded metal insert. Insulating body 6 extends along an axis 29, whose course is approximately the same as the direction of spray of metering device 3, from below, at approximately the center of the cylindrical section of housing 4 with increased wall thickness, up to approximately the level of third diameter step 27; at approximately the level of the middle of chamfer 31, insulating body 6 passes over into a thin-walled indentation of the outer diameter and thus forms a third shoulder 34. Insulating body 6 features a continuous opening running along axis 29, having a mostly uniform inner diameter throughout. In the upper area, however, the opening features an increased inner diameter, while at the lower opening, which is assigned to the spray-side part of metering device 3, in the direction of flow outlet 9, it initially features an indentation reducing the size of the opening, the indentation then immediately opening up again in the downward direction, widening conically almost to the full outer diameter of the lower area of insulating body 6.

The continuous opening of insulating body 6 includes approximately the lower, spray-side half of metering device 3, while largely retaining a predominantly uniform first gap 10. Insulating body 6 and metering device 3 touch each other only in a diameter enlargement 33 of metering device 3 located near the lower end of metering device 3. This diameter enlargement 33 serves to guide metering device 3 during installation and operation. Ideally, metering device 3 does not rest on insulating body 6 with its lower spray-side end. Metering device 3 injects fuel through a spray-discharge opening (not shown) at the lower spray-side end of metering device 3 in a mixing area 7 situated between the spray-discharge opening (not shown) and flow outlet 9 in housing 4, ideally finely divided, at a low mean diameter and possibly swirling, into the temperature-adjusted substance stream flowing through mixing area 7, which is fed into mixing area 7 via a supply line 12 and through a flow inlet 8 located laterally between first and second diameter steps 25, 26.

In mixing area 7, the imaginary extension of the longitudinal axis of supply line 12 is inclined towards flow outlet 9, deviating from a right angle with respect to axis 29. This relieves the spray-side part of metering device 3 and insulating body 6 from the thermal effects of the temperature-adjusted substance stream and improves the flow pattern. The imaginary extension of the longitudinal axis of supply line 12 also runs tangentially with respect to the direction of spray and with respect to axis 29. The swirl of the temperature-adjusted substance stream thereby generated has a positive effect on the atomization, the uniform distribution of fuel and the heat absorption from the walls of housing 4.

Supporting device 2 additionally features a disk-like upper housing part 5 having a round opening approximately at the center, through which metering device 3 engages. Upper housing part 5 rests on third shoulder 34 of insulating body 6 only with a protruding ring-shaped support seat 35 formed at its bottom side. Chamfer 31 located in this area prevents direct contact between upper housing part 5 and housing 4 in this area. Support ring 17 is dimensioned and positioned in such a way that it likewise does not come into contact with upper housing part 5. Upper housing part 5 is fixed to housing 4 by fixing elements 22, implemented in this exemplary embodiment as bolt-nut elements, which reach through openings (not shown) situated peripherally in upper housing part 5, parallel to axis 29, as well as openings (likewise not shown) that are located in third shoulder 34 and form pairs with the openings in upper housing part 5. The side of fixing element 22 facing the upper side of upper housing part 5 and the side of fixing element 22 facing third diameter step 27 are thermally insulated from upper housing part 5 and from housing 4 by insulating elements 23, which are implemented in this exemplary embodiment as ceramic washers. Ring-shaped support seat 35 protruding on the lower side of upper housing part 5 is dimensioned in such a way, or protrudes from the lower side of upper housing part 5 to such an extent, that upper housing part 5 does not directly touch housing 4 and is thus thermally insulated from housing 4 by a second gap 11.

Fixing elements 22 produce a contact pressure in the seat area of third shoulder 34 and support seat 35, which is transmitted to first seal 14. The contact pressure is so great that process gases are unable to escape into the environment from mixing area 7 via possibly existent gaps between insulating body 6 and housing 4 and via second gap 11. The thin-walled indentation of the outer diameter of insulating body 6, which forms third shoulder 34 and which is separated on its inside from metering device 3 by first gap 10, features on its outside facing the inside of protruding support seat 35 at the top, a third chamfer 39. A second chamfer 38 is found at the edge between the two sides of support seat 35, which face the thin-walled indentation of the outer diameter of insulating body 6 and third shoulder 34. A ring-shaped second seal 15, inserted into support seat 35 between second chamfer 38 and third chamfer 39, seals the environment against process gases which could otherwise escape from mixing area 7 via first gap 10, the contact area between third shoulder 34 and support seat 35 (implemented in this exemplary embodiment without a seal) chamfer 31, past support ring 17 and through second gap 11. Chamfers 38 and 39 reduce heat-transferring surface contacts between insulating body 6 and upper housing part 5 and facilitate installation.

With its round opening located approximately at the center, disk-like upper housing part 5 features a fourth chamfer 40 at the upper circumference of its opening. Approximately at the center of chamfer 40, a ring-shaped third seal 16 is inserted, on which metering device 3 rests with a second shoulder 30. A spring 20, attached to upper housing part 5 via a spacer tube 37 and a screw 21, clamps metering device 3 against third seal 16 via a first shoulder 19 of metering device 3. A ring-shaped heat sink 18 surrounds metering device 3 between first and second shoulders 19, 30 and passively dissipates heat from the coil area of metering device 3 located in that region. Alternatively, for example, a cooling ring having coolant flowing through it may be used as well.

The heat-insulating measures such as, for example, the thin-walled construction of the area of housing 4 near the reformer, insulating body 6, gaps 10 and 11, recess 13, as well as the increased heat-dissipating surface obtained by increasing the surface facing the environment by virtue of the design of the shape of housing 4 and upper housing part 5 above mixing area 7, reduce the thermal loads, especially for metering device 3, first seal 14, second seal 15 and third seal 16. Especially in the case of seals 15, 16, this makes it possible to chose less expensive and more easily processable materials such as elastomers, for example.

The position of fixing elements 22 at the side of housing 4 facing away from the reformer (not shown)—the housing on this side also featuring the largest heat-dissipating surface,—contributes to the thermal insulation of upper housing part 5 and metering device 3. Active cooling in the area of the spray orifice (not shown) of metering device 3 is not necessary, thus simplifying construction and making it more reliable and less expensive. Active cooling would also increase the thermal capacity in the spray-side environment of metering device 3, which, in the case of an insufficient supply of heat, for example in cold start operation, could result in insufficient fuel vaporization over a longer period of time. Moreover, the heat-insulating measures also reduce the heat-absorption of atomization system 2 from the reformer (not shown) during operation, the absorption of heat from the reformer (not shown) in mixing area 7 being reduced only to such an extent that it is certainly sufficient for the vaporization of the fuel. This is advantageous especially in a cold start phase.

Bore holes 36 in the radial outer surfaces of upper housing part 5 allow for the attachment of atomization system 1 to other assemblies (not shown) or components (not shown), which may further improve the dissipation of heat.

Figure 2:
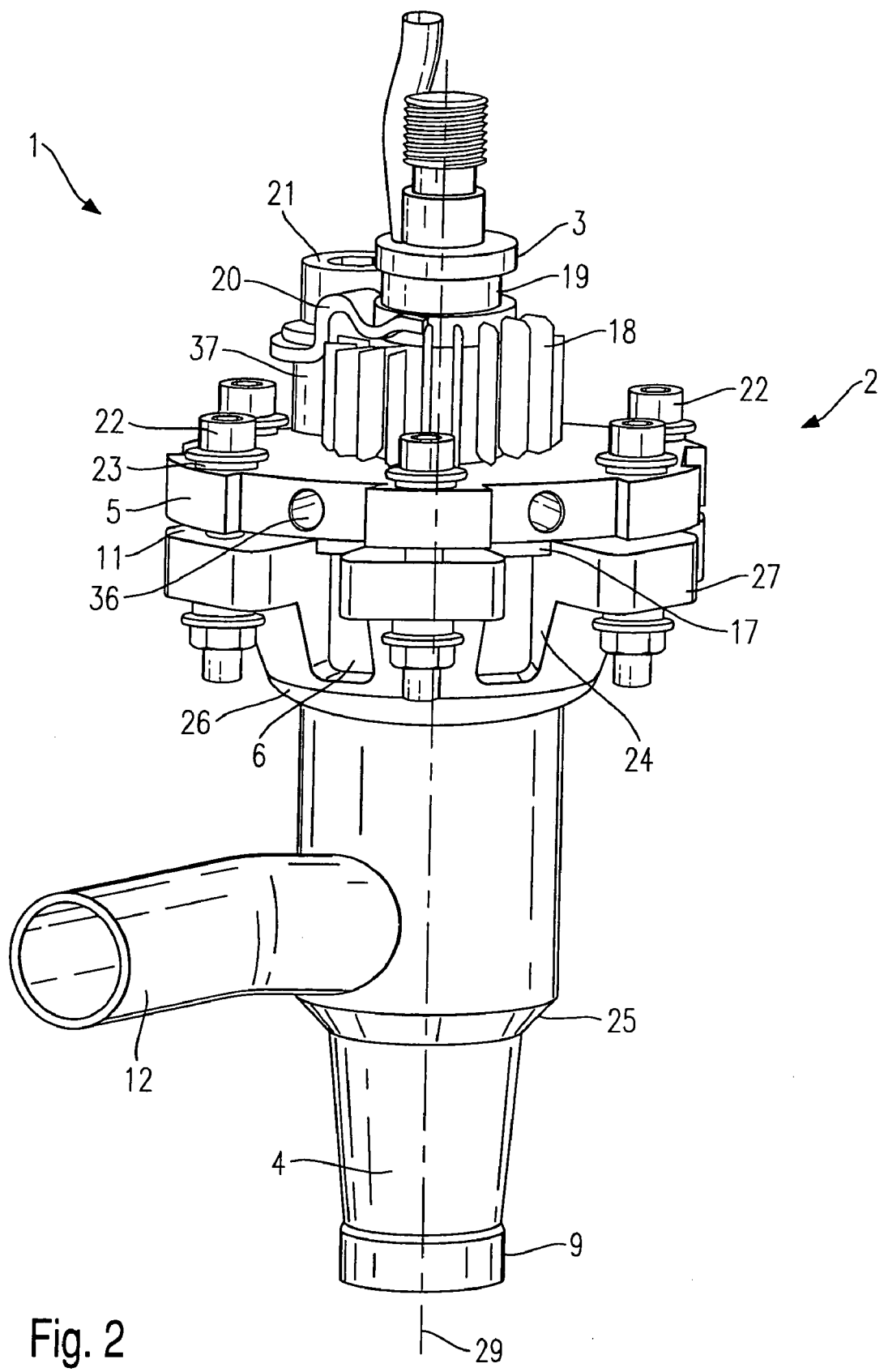
FIG. 2 is a schematic exterior view of the exemplary embodiment of FIG. 1 rotated by approximately 90°.

FIG. 2 shows an exterior view of the exemplary embodiment depicted in FIG. 1 rotated about axis 29 by approximately 90°. Recesses 24 visible in this view, which, at approximately uniform intervals about the circumference, open housing 4 in places starting from second diameter step 26 upward, serve to minimize the heat exchange surface between insulating body 6 and housing 4. Gap 11 running between upper housing part 5 and housing 4 can be seen clearly.

Figure 3:
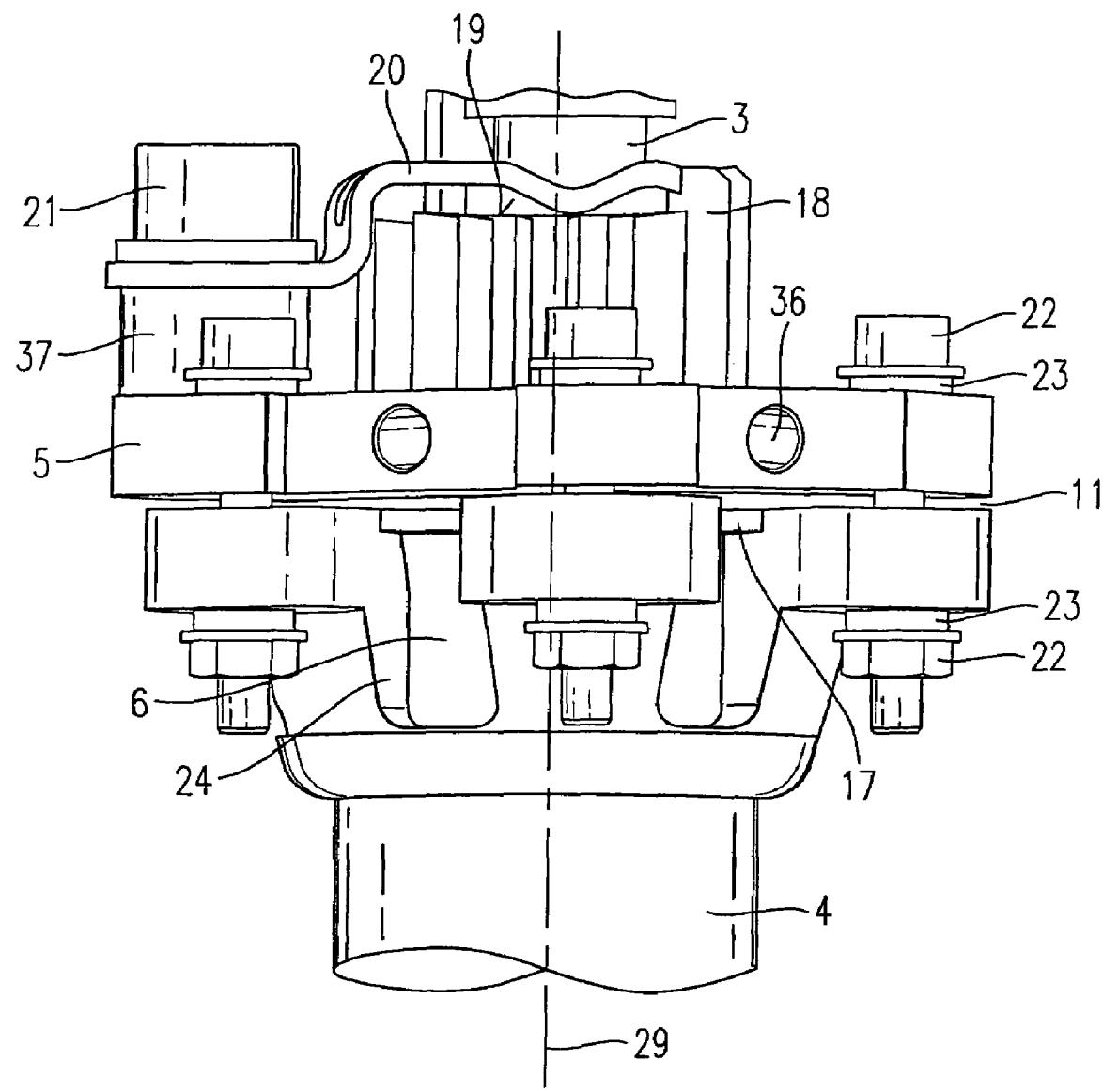
FIG. 3 is a schematic exterior view of an exemplary embodiment in the area of the upper housing part.

FIG. 3 shows an exterior view of the exemplary embodiment according to the present invention already depicted in FIGS. 1 and 2 in the area of upper housing part 5. As in FIG. 2, recesses 24 and gap 11 can also be seen clearly in this view. Support ring 17, which braces the upper part of housing 4 facing upper housing part 5 against radially acting forces caused, for example, by fixing elements 22, is likewise clearly visible.

Figure 4:
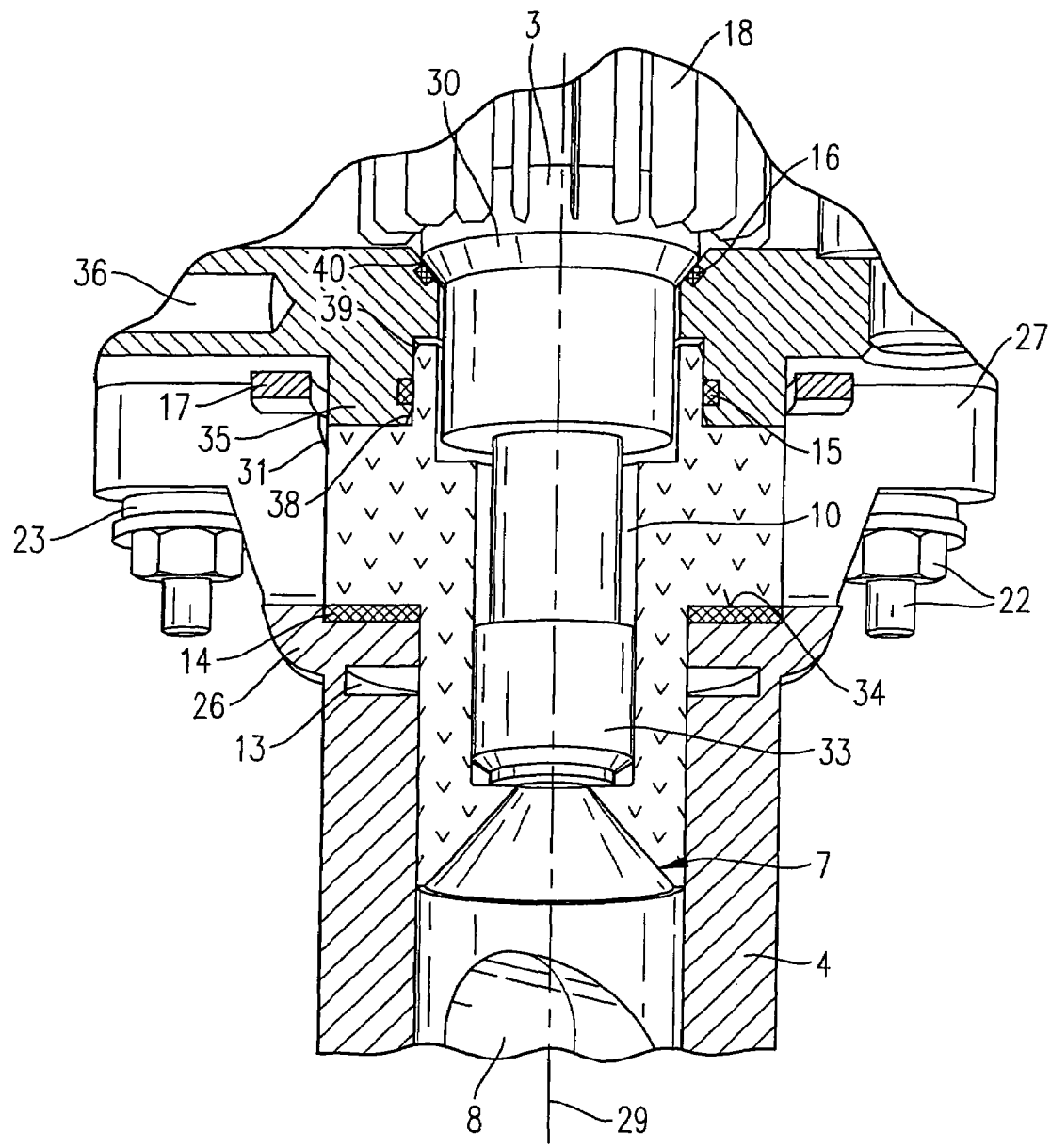
FIG. 4 is a schematic sectional view of an exemplary embodiment in the area of the upper housing part.

FIG. 4, in a schematic sectional view in the area of upper housing part 5, shows the profile of first to fourth chamfers 31, 38, 39, 40 as well as the profile of second shoulder 30 particularly clearly. Thus, it is visible that second shoulder 30 increases conically upward in diameter. In interaction with fourth chamfer 40, this facilitates the centering of metering device 3 during installation. This ensures a uniform width of first gap 10 around metering device 3 and the sealing of first gap 10 vis-à-vis the environment.

What is claimed is:

1. An atomization for charging a chemical reformer for obtaining hydrogen, comprising:
   a supporting device; and
   at least one metering device accommodated in the supporting device for metering fuel into a temperature-adjusted substance stream, wherein the metering device introduces the fuel directly into the temperature-adjusted substance stream without interpolation of a supply line;
   wherein the metering device is thermally insulated from the supporting device;
   further comprising an insulating body, the metering device being thermally insulated by the insulating body;
   wherein the metering device is insulated from the insulating body by a first gap;
   wherein the supporting device includes a primary housing, through which the temperature adjusted substance stream flows, and an upper housing part not in direct contact with the primary housing; and
   wherein the upper housing part is insulated from the primary housing by a second gap.

2. The atomization system of claim 1, wherein the metering device includes at least one opening for metering in fuel.

3. The atomization system of claim 1, wherein the metering device includes a fuel injector that ejects fuel in a manner that is metered.

4. The atomization system of claim 3, wherein the fuel injector ejects fuel in a manner that is swirled.

5. The atomization system of claim 4, wherein the fuel injector is a high pressure fuel injector operating with fuel pressures of 20 to 150 bar.

6. The atomization system of claim 1, wherein the temperature-adjusted substance stream flows through the supporting device.

7. The atomization system of claim 1, wherein the upper housing part only directly contacts the insulating body.

8. The atomization system of claim 1, further comprising:
   fixing elements which mutually lock the housing and the upper housing part in place.

9. The atomization system of claim 1, wherein the metering device meters fuel into a mixing area.

10. The atomization system of claim 1, wherein the primary housing includes a recess for inhibiting heat conduction.

11. An atomization system for charging a chemical reformer for obtaining hydrogen, comprising:
    a supporting device; and
    at least one metering device accommodated in the supporting device for metering fuel into a temperature-adjusted substance stream, wherein the metering device introduces the fuel directly into the temperature-adjusted substance stream without interpolation of a supply line;
    wherein the metering device is thermally insulated from the supporting device;
    further comprising an insulating body, the metering device being thermally insulated by the insulating body;
    wherein the metering device is insulated from the insulating body by a first gap;
    wherein the supporting device includes a primary housing, through which the temperature adjusted substance stream flows, and an upper housing part not in direct contact with the primary housing;
    further comprising fixing elements which mutually lock the housing and the upper housing part in place and
    wherein the fixing elements are thermally insulated from at least one of the primary housing and the upper housing part by further insulating elements.

12. The atomization system of claim 11, wherein the further insulating elements are at least partly made of a ceramic material.

13. An atomization for charging a chemical reformer for obtaining hydrogen, comprising:
    a supporting device; and
    at least one metering device accommodated in the supporting device for metering fuel into a temperature-adjusted substance stream, wherein the metering device introduces the fuel directly into the temperature-adjusted substance stream without interpolation of a supply line;
    wherein the metering device is thermally insulated from the supporting device;
    further comprising an insulating body, the metering device being thermally insulated by the insulating body;
    wherein the metering device is insulated from the insulating body by a first gap;
    wherein the supporting device includes a primary housing, through which the temperature adjusted substance stream flows, and an upper housing part not in direct contact with the primary housing; and
    wherein only the upper housing part supports the metering device.

14. An atomization for charging a chemical reformer for obtaining hydrogen, comprising:
    a supporting device; and
    at least one metering device accommodated in the supporting device for metering fuel into a temperature-adjusted substance stream, wherein the metering device introduces the fuel directly into the temperature-adjusted substance stream without interpolation of a supply line;
    wherein the metering device is thermally insulated from the supporting device;
    further comprising an insulating body, the metering device being thermally insulated by the insulating body;
    wherein the metering device is insulated from the insulating body by a first gap;
    wherein the supporting device includes a primary housing, through which the temperature adjusted substance stream flows, and an upper housing part not in direct contact with the primary housing;
    further comprising
    a seal between the metering device and the upper housing part that seals the first gap.

15. The atomization system of claim 14, wherein the supporting device includes a primary housing, through which the temperature adjusted substance stream flows, and an upper housing part not in direct contact with the primary housing.

16. The atomization system of claim 14, wherein the seal is at least partly made of an elastomer.

17. An atomization system for charging a chemical reformer for obtaining hydrogen, comprising:
    a supporting device; and
    at least one metering device accommodated in the supporting device for metering fuel into a temperature-adjusted substance stream, wherein the metering device introduces the fuel directly into the temperature-adjusted substance stream without interpolation of a supply line;

wherein the metering device is thermally insulated from the supporting device;

further comprising an insulating body, the metering device being thermally insulated by the insulating body; and wherein the insulating body is at least partly made of a ceramic material;

wherein the metering device is insulated from the supporting device by a first gap;

wherein the metering device meters fuel into a mixing area; and wherein the temperature-adjusted substance stream is fed one of radially and at least partly tangentially into the mixing area through a supply line.

18. The atomization system of claim 17, wherein the primary temperature-adjusted substance stream fed from the supply line into the mixing area is directed away from the metering device as it enters the mixing area.

* * * * *